US008970616B2

United States Patent
Lee et al.

(10) Patent No.: US 8,970,616 B2
(45) Date of Patent: Mar. 3, 2015

(54) METHOD FOR ADJUSTING IMAGE-QUALITY AND DISPLAY UNIT ENABLING THE SAME

(75) Inventors: Jong Ha Lee, Anyang-si (KR); Duk Jun Jo, Ulsan (KR)

(73) Assignee: LG Electronics Inc., Seoul (KR)

( * ) Notice: Subject to any disclaimer, the term of this patent is extended or adjusted under 35 U.S.C. 154(b) by 1181 days.

(21) Appl. No.: 12/716,763

(22) Filed: Mar. 3, 2010

(65) Prior Publication Data
US 2011/0069081 A1 Mar. 24, 2011

(30) Foreign Application Priority Data

Sep. 24, 2009 (KR) .................. 10-2009-0090508
Sep. 25, 2009 (KR) .................. 10-2009-0091048

(51) Int. Cl.
*G09G 5/02* (2006.01)
*G09G 5/14* (2006.01)
*G06F 3/14* (2006.01)

(52) U.S. Cl.
CPC ............... *G06F 3/1438* (2013.01); *G09G 5/14* (2013.01); *G09G 2320/06* (2013.01); *G09G 2320/08* (2013.01)
USPC ........... 345/593; 345/581; 345/568; 725/141; 725/78; 348/564; 348/576; 348/552; 348/570

(58) Field of Classification Search
USPC .............................. 345/593, 581; 725/141, 78
See application file for complete search history.

(56) References Cited

U.S. PATENT DOCUMENTS

| 5,307,055 | A | 4/1994 | Baskin et al. |
| 6,097,441 | A | 8/2000 | Allport |
| 6,281,895 | B1 | 8/2001 | Jeong |
| 6,407,776 | B1 | 6/2002 | Sekimoto et al. |
| 6,567,984 | B1 | 5/2003 | Allport |
| 6,816,201 | B1 | 11/2004 | Fang et al. |
| 7,075,587 | B2 | 7/2006 | Lee |
| 2001/0019326 | A1 | 9/2001 | Yuasa |
| 2002/0057209 | A1 | 5/2002 | Sampsell |
| 2002/0122137 | A1 | 9/2002 | Chen et al. |
| 2002/0190998 | A1 * | 12/2002 | Bao et al. ...................... 345/589 |
| 2003/0128296 | A1 | 7/2003 | Lee |
| 2004/0027393 | A1 * | 2/2004 | Kato et al. .................... 345/838 |
| 2004/0045039 | A1 | 3/2004 | Harrison et al. |
| 2004/0055018 | A1 | 3/2004 | Stone |
| 2006/0053472 | A1 * | 3/2006 | Goto et al. .................... 725/141 |

(Continued)

FOREIGN PATENT DOCUMENTS

CN 1243990 A 2/2000
EP 2 088 775 A1 8/2009

(Continued)

Primary Examiner — Shaheda Abdin
(74) Attorney, Agent, or Firm — Birch, Stewart, Kolasch & Birch, LLP (57) ABSTRACT

A method of displaying images, which includes displaying a first image in a first display portion, receiving a first image-quality condition for setting a first image quality of the first image displayed in the first display portion, generating, via a first display controller of the first display portion, a first image-quality setting image by applying the first image-quality condition to the first image displayed in the first display portion, transmitting the generated first image-quality setting image from the first display controller to a second display controller of a second display portion, and displaying the transmitted first image-quality setting image on the second display portion.

18 Claims, 7 Drawing Sheets

(56) References Cited

U.S. PATENT DOCUMENTS

| | | |
|---|---|---|
| 2007/0040763 A1 | 2/2007 | Lyu |
| 2007/0199020 A1 | 8/2007 | Kim et al. |
| 2007/0258010 A1* | 11/2007 | Hong et al. .......... 348/564 |
| 2008/0005696 A1 | 1/2008 | Shivaji-Rao |
| 2009/0017872 A1 | 1/2009 | Myers et al. |
| 2009/0184887 A1 | 7/2009 | Mizuno et al. |
| 2009/0195695 A1 | 8/2009 | Kawade |
| 2009/0251431 A1 | 10/2009 | Lee et al. |
| 2009/0289874 A1 | 11/2009 | Ha |
| 2009/0303261 A1 | 12/2009 | Fard |
| 2010/0271549 A1 | 10/2010 | Kuwabara et al. |

FOREIGN PATENT DOCUMENTS

| | | |
|---|---|---|
| KR | 10-2000-0054254 A | 9/2000 |
| KR | 10-2003-0060079 A | 7/2003 |
| KR | 10-2004-0019797 A | 3/2004 |
| KR | 10-2007-0110666 A | 11/2007 |
| WO | WO 2009/050846 A1 | 4/2009 |

\* cited by examiner

METHOD FOR ADJUSTING IMAGE-QUALITY AND DISPLAY UNIT ENABLING THE SAME

CROSS REFERENCE TO A RELATED APPLICATION

This application claims the benefit of Patent Korean Application No. 10-2009-90508, filed on Sep. 24, 2009 and Korean Application No. 10-2009-91048, filed on Sep. 25, 2009, which are hereby incorporated by reference in their entirety.

BACKGROUND OF THE DISCLOSURE

1. Field of the Disclosure

The present invention relates to a display device and corresponding method for adjusting and setting a displayed image-quality.

2. Discussion of the Related Art

Televisions such as LCD televisions are now very common in households across America. In fact, most homes often have multiple televisions. Thus, a person can now watch television while they are cooking in a kitchen area, can watch a sporting event in a home theatre environment, etc. Television, Cable and broadcasting companies also provide a variety of channels the user can watch such as movies, sporting events, news programs, etc.

Figure 1:
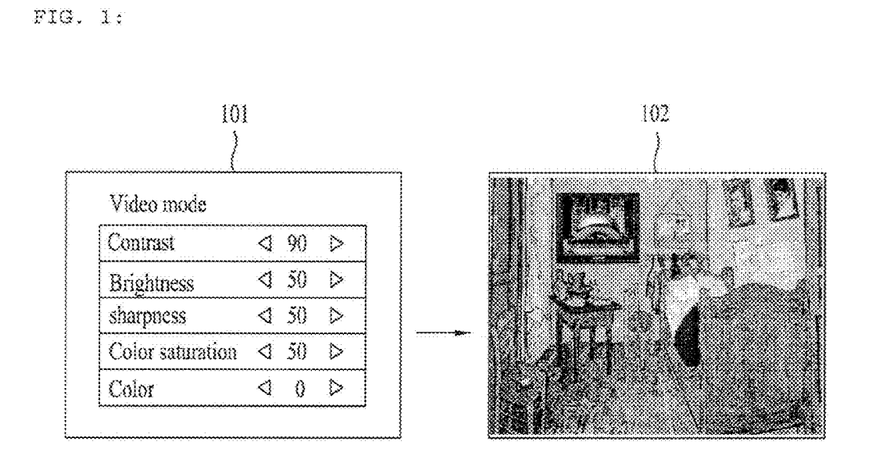
FIG. 1 is a diagram illustrating a method for setting an image-quality in a related art broadcasting receiver.

Each user, however, may want to set the display of the television set to have different image qualities depending on the particular program they are watching, depending on the lighting in the room, etc. Therefore, as shown in FIG. 1, the user can set an image-quality condition of the display by selecting values from a user interface 101. The conditions include the contrast, brightness, sharpness, etc. The user can then select particular values for the different image conditions and the display 102 of the television is set according to the user-set image conditions.

However, the user-set image conditions are somewhat tedious and cumbersome to set, and interrupt the user from viewing information on the display of the television. This often inconveniences the users, especially people who are not readily familiar with setting image display conditions for televisions.

SUMMARY OF THE DISCLOSURE

Accordingly, one object of the present invention is to address the above-noted and other problems.

Another object of the present invention is to provide a display device and corresponding method that allows the user to easily set image-quality conditions for the display device.

To achieve these objects and other advantages and in accordance with the purpose of the invention, as embodied and broadly described herein, the present invention provides in one aspect a method of displaying images, and which includes displaying a first image in a first display portion, receiving a first image-quality condition for setting a first image quality of the first image displayed in the first display portion, generating, via a first display controller of the first display portion, a first image-quality setting image by applying the first image-quality condition to the first image displayed in the first display portion, transmitting the generated first image-quality setting image from the first display controller to a second display controller of a second display portion, and displaying the transmitted first image-quality setting image on the second display portion.

In another aspect, the present invention provides a display device including a first display portion configured to display a first image, a receiver configured to receive a first image-quality condition for setting a first image quality of the first image displayed in the first display portion, a first display controller of the first display portion configured to generate a first image-quality setting image by applying the first image-quality condition to the first image displayed in the first display portion, and to transmit the generated first image-quality setting image to a second display controller, and a second display portion physically separated from the first display portion and configured to display the transmitted first image-quality setting image.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure.

In the drawings.

DESCRIPTION OF SPECIFIC EMBODIMENTS

Reference will now be made in detail to the specific embodiments of the present invention, examples of which are illustrated in the accompanying drawings. Wherever possible, the same reference numbers will be used throughout the drawings to refer to the same or like parts.

Figure 2:
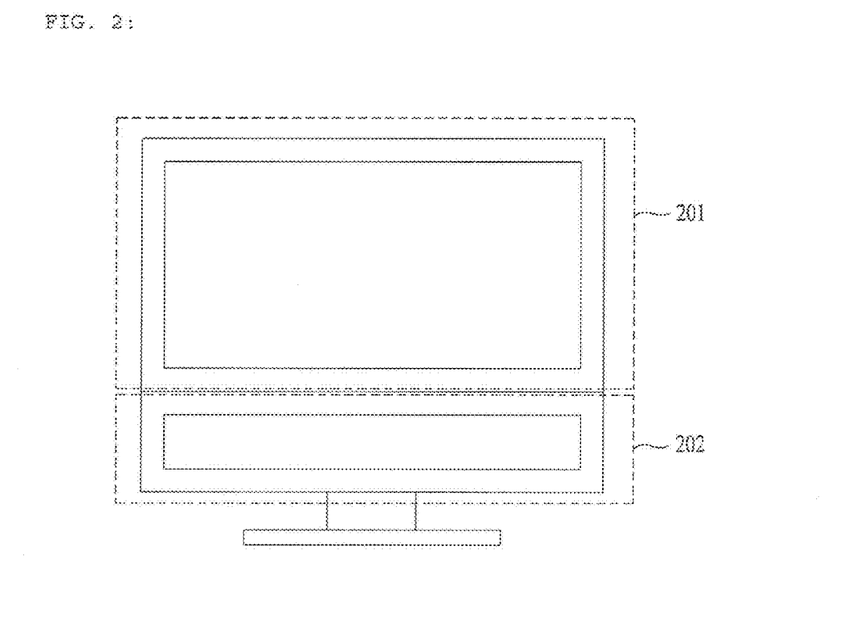
FIG. 2 is a diagram illustrating an embodiment of a display device according to an embodiment of the present invention.

FIG. 2 is a diagram illustrating a display device according to an embodiment of the present invention. As shown, the display device includes a first display 201 and a second display 202. In addition, in this example, the second display 202 is attached to a lower portion of the display device below the first display 201. Thus, information can be displayed in the first display 201 and different information can be displayed in the second display 202.

The first and second displays 201 and 202 are also respectively controlled by first and second display controllers. The first display controller and the second display controller are also connected to a network via a predetermined connection part.

In addition, FIG. 2 illustrates the second display 202 being a single display. However, the second display 202 can be a plurality of displays. The display device in FIG. 2 also includes a broadcasting receiver that receives and outputs contents produced by broadcasting stations via a terrestrial, cable or satellite broadcasting and an Internet protocol television (IPTV) that outputs contents via an internet network.

Figure 3:
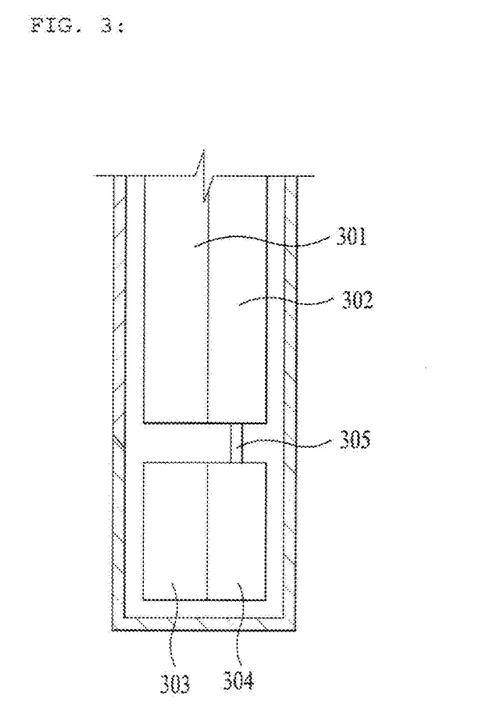
FIG. 3 is a sectional view illustrating a display device according to another embodiment of the present invention.

Next, FIG. 3 is a sectional view illustrating a display device according to another embodiment of the present invention. As shown in FIG. 3, the display device includes a first display 301, a first display controller 302 for controlling the first display 301, a second display 303 and a second display controller 304 for controlling the second display 303. In addition, the second display 303 and the second display controller 304 are attached to a predetermined surface of the display device. For example, the second display 303 and the second display controller 304 in FIG. 3 are attached to a lower portion of a predetermined surface of the display device below the first display 301 and the first display controller 302.

Further, the first display controller 302 and the second display controller 304 are connected to a network via a predetermined connection part 305. In more detail, the connection part 305 transmits various types of data, control signals and images to the second display controller 304 from the first display controller 302, and transmits a power source to the second display 303 or the second display controller 304. For example, the connection part 305 may be a wire/wireless data port such as a module for short range communication including a universe serial bus (USB), Bluetooth, radio frequency identification (RFID), infrared data association (IrDA), ultra wideband (UWB) and ZigBee.

Figure 4:
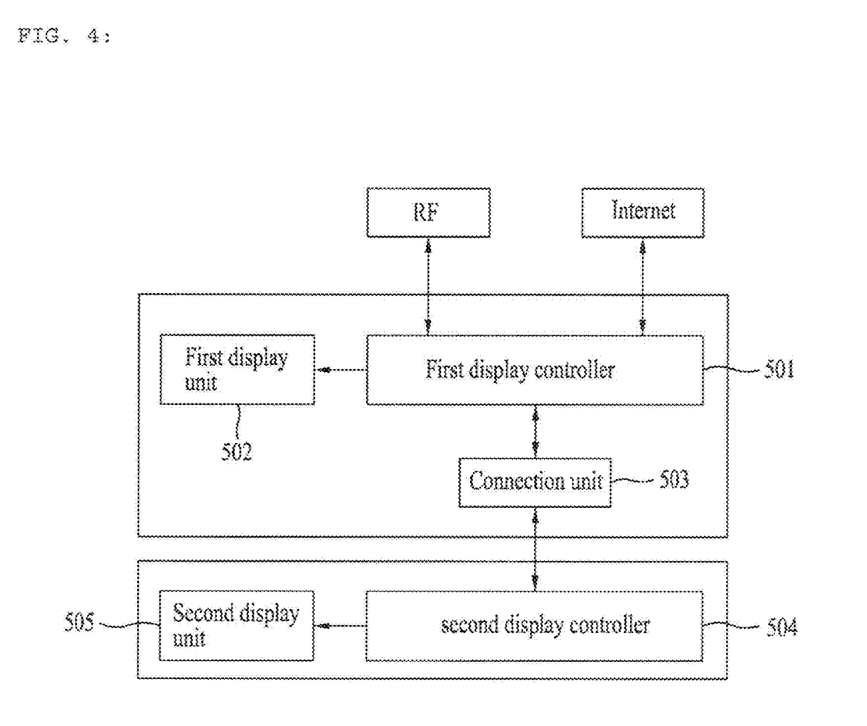
FIG. 4 is a block diagram illustrating a display unit according to yet another embodiment of the present invention.

Next, FIG. 4 is a block diagram illustrating a display device according to yet another embodiment of the present invention. As shown in FIG. 4, the display device includes a first display controller 501, a first display unit 502, a connection part or unit 503, a second display controller 504 and a second display unit 505. The first display controller 501 receives and displays a video signal externally received or that is stored in memory associated with the display device on the first display unit 502.

In addition, the video signal includes contents received via an Internet network as well as a broadcasting signal received via a terrestrial, cable or satellite broadcasting. The broadcasting signal may also include a TV broadcasting signal and data broadcasting signal and include a broadcasting signal combined with a TV broadcasting signal and a data broadcasting signal.

Further, according to an embodiment of the present invention, the first display controller 501 receives image-quality setting conditions from the user and applies the input image-quality setting conditions to a predetermined sample image so as to generate an image-quality setting image. The first display controller 501 also outputs a predetermined user interface to receive the image-quality setting conditions from the user.

The first display controller 501 then outputs the generated image-quality setting image to the second display controller 504, and the second display controller 504 receives the image-quality setting image via the connection part 503 and displays the image-quality setting image on the second display unit 505.

Further, the first display controller 501 can receive the image-quality setting conditions from the user plural number of times and generate plural image-quality setting images by applying the input image-quality setting conditions to the sample image. The second display controller 504 then receives the plural image-quality setting images and controls the second display 505 to display the plural image-quality setting images.

Also, the display device can output the sample image to the first display unit 502 so the user can compare the sample image to the plural image-quality setting images output on the second display unit 505. In addition, when the user selects one of the plural image-quality setting images output on the second display unit 505, the first display controller 501 outputs the selected image-quality setting image on the first display unit 502.

In addition, when the user selects the image-quality setting displayed in the first display unit 502, the first display controller 501 applies the image-quality setting condition set in the image-quality setting image displayed on the first display unit 502 to the display device. That is, the first display controller 501 receives one of the plural image-quality setting images output on the second display unit 505 that is selected by the user and applies the set image-quality setting condition set in the selected image setting image to the display device.

In addition, the sample image can be an image stored in the memory or a still image extracted from a moving image being display on the display device. For example, if a user is watching a movie on the first display unit 502, the sample image can be a still image extracted from the movie. The image-quality setting conditions are then applied to the still image, and the newly generated image including the applied image-quality conditions is displayed on the second display unit 505. The sample image can also be an image stored in the memory of the display device or a memory attached to the display device or downloaded from the Internet, for example.

Figure 5:
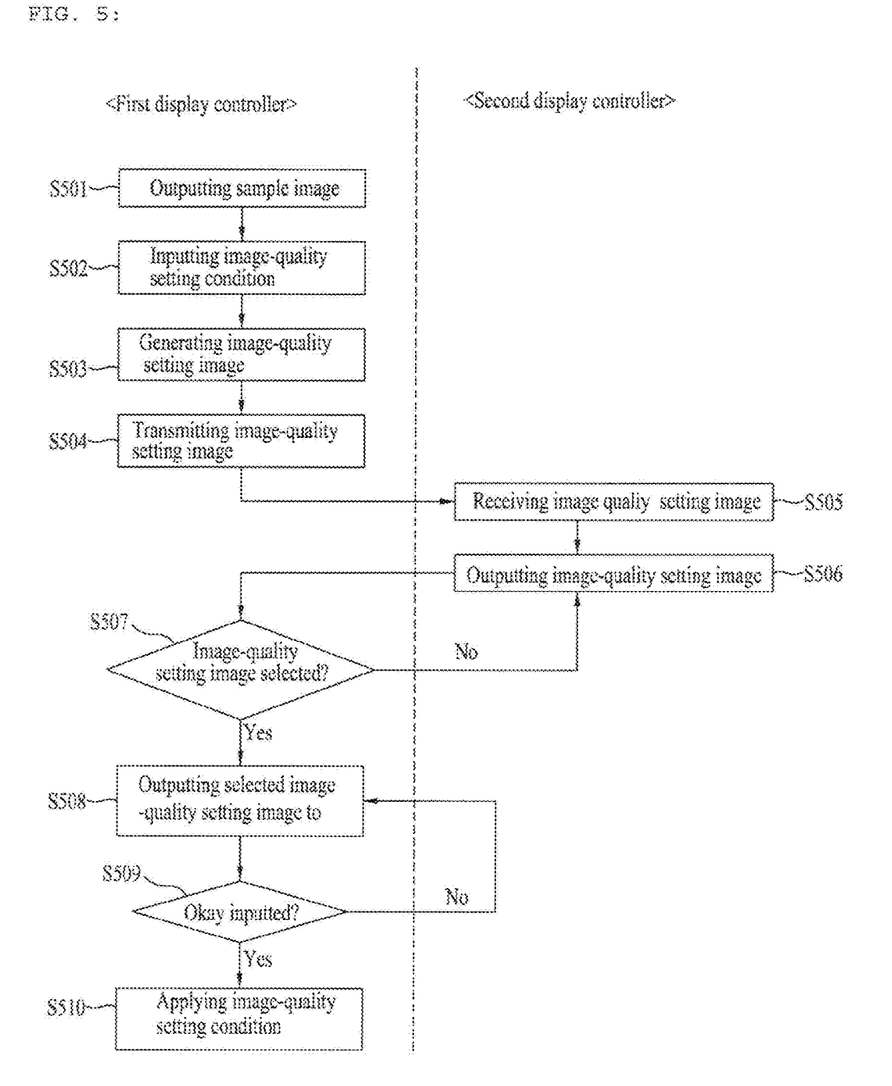
FIG. 5 is a flow chart illustrating a method of setting an image-quality according to an embodiment of the present invention.
Figure 6:
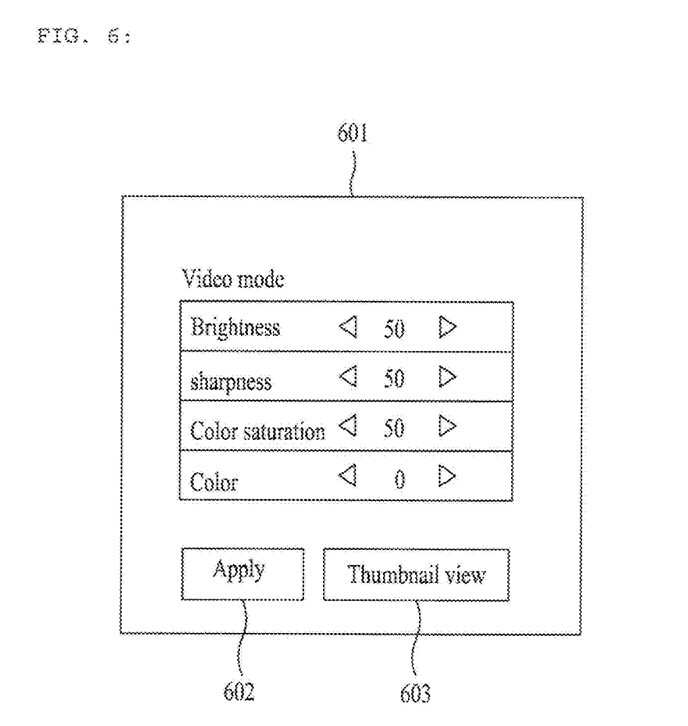
FIG. 6 is a diagram illustrating a user interface for setting image-quality setting conditions according to an embodiment of the present invention.

Next, FIG. 5 is a flow chart illustrating a method of performing an image-quality setting operation according to an embodiment of the present invention. FIG. 4 will also be referred to in this description. As shown in FIG. 5, the user first initiates the image-quality setting operation, and the first display controller 510 displays a sample image (S501) and an image-quality setting menu that the user can use to set the desired image-quality setting conditions (S502). FIG. 6 illustrates an example of such an image-quality setting conditions menu 601.

As shown in FIG. 6, the image-quality setting conditions in the image-quality setting menu 601 include at least one of a brightness, a sharpness, a color saturation, a color and the like from the user. Also, the image-quality setting conditions are conditions applicable when the display device outputs a video signal and may include other various types of image-quality setting parameters. Also, when the user selects the Apply option 602 of the image-quality setting menu 601, the display device applies the input image-quality setting conditions, and when the user selects the View thumbnail option 603 of the image-quality setting menu 601, the display device outputs the sample image having the image-quality setting conditions to the second display controller.

In more detail, as shown in FIG. 5, the first display controller 501 sets the input image-quality setting conditions to the predetermined sample image or images to generate the image-quality setting image (S503). Further, as discussed above, the sample image may be an image stored in the memory associated with the display device or the video signal output on the display device.

The first display controller 501 then outputs the generated image-quality setting images to the second display controller 504 (S504). The second display controller 504 also receives the image-quality setting images via the connection unit (S505) and displays the input image-quality setting images on the second display unit 505 (S506). As discussed above, the user can generate a plurality of different images having different image conditions and then display the plurality of different image-quality setting images on the second display unit 505. The user can also generate only one single image-quality setting image rather than a plurality of images.

Thus, as described above, the first display controller 501 applies the input image-quality setting conditions to the sample images, respectively, and generates plural image-quality setting images that are to be output to the second display controller 504. The second display controller 504 then receives and controls the plural image-quality setting images to be output on the second display unit 505. A single image-quality setting image can also be generated and output on the second display unit 505. Further, the display device can also output the sample image before being set with the image-quality setting conditions to the first display unit 502 to compare the plural image-quality setting images output on the second display unit 505.

As shown in FIG. 5, the first display controller 501 determines whether the user has selected one of the plural image-quality setting images output in a screen of the second display unit 505 (S507). Then, when the user selects one of the plural image-quality setting images (Yes in S507), the first display controller 501 outputs the selected image-quality setting image on the first display unit 502 (S507). The first display controller 501 also determines whether the user has selected an OK option such that the image conditions for the selected image-quality setting image displayed in the first display 502 are applied to the display device (S509).

Figure 8:
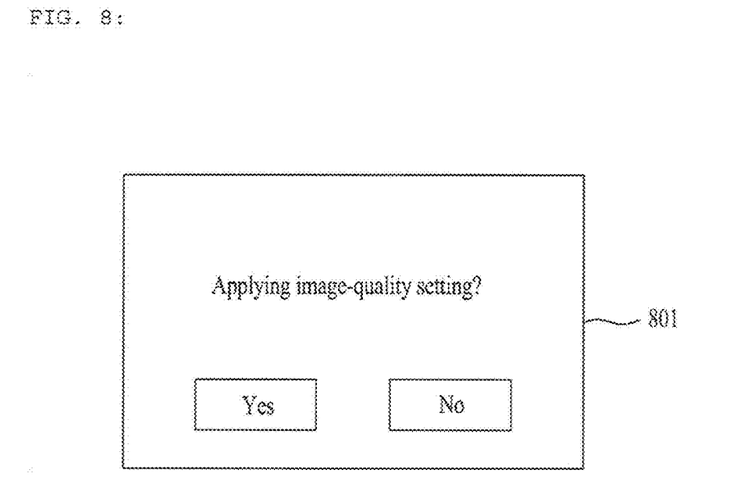
FIG. 8 is a diagram illustrating a user interface output when a user selects an image-quality setting image according to an embodiment of the present invention.

If the user has selected the OK option (Yes in S509), the first display controller 501 applies the image-quality setting conditions to the display device (S510). For example, if the user selects an okay button included on an external input mechanism such as a remote control after selecting the image displayed in the first display 502, a user interface 801 such as that shown in FIG. 8 can be displayed to confirm whether or not the user wants to apply the image-quality setting conditions to the display device. If the user selects the Yes option, the image-quality setting conditions are applied to the display unit. Alternatively, the image-quality setting conditions can be directly applied to the display device when the user selects an image in the second display unit 505 and then selects an okay button on a remote controller, for example.

Figure 7:
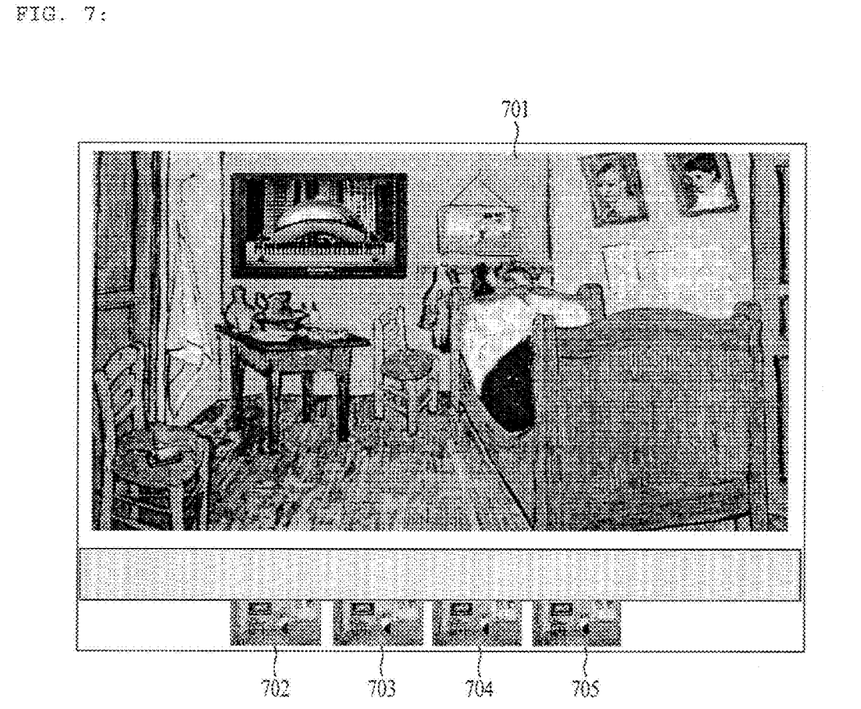
FIG. 7 is a diagram illustrating a second display outputting image-quality setting images according to an embodiment of the present invention.

Turning next to FIG. 7, which is a diagram illustrating a second display unit displaying user-input image-quality setting images 702, 703, 704 and 705. A first display also displays an image such as a movie or still image. In more detail, the user can watch a movie in the first display unit and then select an option to set image-quality setting conditions for the display device. Thus, with reference to FIG. 7, the user has performed four setting operations to create the images 702-705 that have been generated using different user-input image-quality setting conditions. Thus, the user can view the images 702-705 displayed in the second display unit and select one of the images that the user prefers.

When the user selects one of the images 702-705 in the second display, the selected image can be displayed as a full image 701 in the first display that the user can view to determine if they still like the image-quality setting conditions. If the user does like the image-quality setting conditions, the user can select the image 701 displayed in the first display to have the display device be set with the input image-quality setting conditions.

Also, as discussed above, the image 701 can also be the sample image before the image-quality conditions have been applied so the user can compare the sample image to the other image-quality setting images.

Also, in another embodiment, the generated images 702-705 can be generated and displayed without interrupting the movie or images being displayed in the first display portion. This is particular advantageous when the user wants to set different image-quality setting conditions for a same movie, for example, that is currently being displayed without interrupting the movie being displayed on the first display unit. Thus, in this embodiment, the user can select a predefined button on a remote control, for example, to have a still image captured from the moving or program currently being displayed in the first display unit, and then display a image-quality setting conditions graphic user interface such as that shown in FIG. 6 in the second display portion. The user can then select desired image-quality setting conditions and these conditions are applied to the still image captured from the moving image or program. The still image with the applied image-quality setting conditions is then displayed on the second display unit. The user can also do this operation for a plurality of still images captured from the moving image or program being displayed in the first display.

After the user decides he or she prefers one of the still images displayed on the second display unit, the user can select that particular still image and the display device will be set to include the selected image-quality setting conditions without interrupting the moving image or program being displayed on the first display unit. Thus, the user can change the image-quality setting conditions for a currently displayed program in real-time and on-the-fly while watching the displayed program and without interrupting the displayed program.

Therefore, when the user sets an image-quality condition, a new image is generated with the set condition and displayed in the second display unit such that a plurality of different images are displayed in the second display unit. Thus, the user can see the plurality of different images in the second display unit corresponding to particular portions of the moving image displayed on the first display unit and select one of the plurality of displayed images in the second display unit to change the image condition of the moving image in the first display unit. Thus, because there are several different scenes in the moving image, the user can advantageously repeatedly change image conditions of the first moving image with interrupting display of the moving image. This is particularly advantageous because the user can set image conditions for different scenes (some dark scenes which may require more brightness, etc.).

Therefore, according to embodiments of the present invention, the user can select the image-quality setting condition he/she desires after comparing the image-quality adjusted images. As a result, the user convenience is significantly improved. Furthermore, the plural image-quality setting images displayed in the second display unit allow the user to view different image-quality setting conditions without interrupting the program being displayed in the first display unit.

The present invention encompasses various modifications to each of the examples and embodiments discussed herein. According to the invention, one or more features described above in one embodiment or example can be equally applied to another embodiment or example described above. The features of one or more embodiments or examples described above can be combined into each of the embodiments or examples described above. Any full or partial combination of one or more embodiment or examples of the invention is also part of the invention.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A method of displaying images, the method comprising:
    displaying a first image in a first display portion;
    displaying, on the first display portion, a user interface for receiving image-quality condition settings for the displayed first image from a remote controller;
        receiving a first image-quality condition and a second image-quality condition for setting a first image quality of the first image and a second image-quality of the first image respectively through the user interface, the first image-quality condition and the second image-quality condition being different from each other;
        generating, via a first display controller of the first display portion, a first image-quality setting image by applying the first image-quality condition to the first image and a second image-quality setting image by applying the second image-quality condition to the first image;
        transmitting the generated first image-quality setting image and the generated second image-quality setting image from the first display controller to a second display controller of a second display portion; and
        displaying the transmitted first image-quality setting image and the transmitted second image-quality setting image together on the second display portion~
    wherein the user-interface includes a menu with an apply button for applying the first and second image-quality conditions to the first image, and a view button for displaying thumbnail images of the generated first and second image-quality setting images side-by-side on the second display portion while the first image is simultaneously displayed on the first display portion.

2. The method of claim 1, further comprising:
    receiving a selection signal indicating a selection of one of the first and second image-quality setting images displayed in the second display portion; and
    displaying said selected one of the first and second image-quality setting images in the first display portion.

3. The method of claim 1, further comprising:
    receiving a selection signal indicating a selection of one of the first and second image-quality setting images displayed in the second display portion; and
    setting the first image displayed in the first display portion, without interrupting the displaying of the first image, to have an image-quality corresponding the first or second image-quality conditions of said selected one of the first and second image-quality setting images.

4. The method of claim 1, further comprising:
    receiving a selection signal indicating a selection of the first image-quality setting image displayed in the second display portion; and
    displaying said selected first image-quality setting image in the first display portion.

5. The method of claim 1, further comprising:
    receiving a selection signal indicating a selection of the first image-quality setting image displayed in the second display portion; and
    setting the first image displayed in the first display portion, without interrupting the displaying of the first image, to have an image-quality corresponding the first image-quality condition of the first image-quality setting image.

6. The method of claim 1, wherein the first and second display portions are included in a display device and are physically separated from each other and are connected together by an interface.

7. The method of claim 1, wherein the first image-quality condition includes at least one of a contrast, a brightness, a sharpness, a color saturation and a color to be applied to the first image.

8. The method of claim 1, wherein the first image is a moving image and the first image-quality setting image is a thumbnail still image of the first image.

9. The method of claim 1, wherein the first and second display portions are disposed on the same display device and are physically connected.

10. A display device, comprising:
    a first display portion configured to display a first image;
    a user-interface configured to receive a first image-quality condition and a second image-quality condition for setting a first image quality of the first image and a second image-quality of the first image respectively from a remote controller, the first image-quality condition and the second image-quality condition being different from each other;
    a first display controller of the first display portion configured to generate a first image-quality setting image by applying the first image-quality condition to the first image and a second image-quality setting image by applying the second image-quality condition to the first image, and to transmit the generated first image-quality setting image and the generated second image-quality setting image to a second display controller; and
    a second display portion physically separated from the first display portion and configured to display the transmitted first image-quality setting image and the transmitted second image-quality setting image together;
    wherein the user-interface includes a menu with an apply button for applying the first and second image-quality conditions to the first image, and a view button for displaying thumbnail images of the generated first and second image-quality setting images side-by-side on the second display portion while the first image is simultaneously displayed on the first display portion.

11. The display device of claim 10, wherein the user-interface is further configured to receive a selection signal indicating a selection of one of the first and second image-quality setting images displayed in the second display portion, and
    wherein the second display controller is further configured to display said selected one of the first and second image-quality setting images in the first display portion.

12. The display device of claim 10, wherein the user-interface is further configured to receive a selection signal indicating a selection of one of the first and second image-quality setting images displayed in the second display portion, and
    wherein the first display controller is further configured to set the first image displayed in the first display portion, without interrupting the displaying of the first image, to have an image-quality corresponding the first or second image-quality conditions of said selected one of the first and second image-quality setting images.

13. The display device of claim 10, wherein the user-interface is further configured to receive a selection signal indicating a selection of the first image-quality setting image displayed in the second display portion, and wherein the first display controller is further configured to display said selected first image-quality setting image in the first display portion.

14. The display device of claim 10, wherein the user-interface is further configured to receive a selection signal indicating a selection of the first image-quality setting image displayed in the second display portion, and wherein the first display controller is further configured to set the first image displayed in the first display portion, without interrupting the displaying of the first image, to have an image-quality corresponding the first image-quality condition of the first image-quality setting image.

15. The display device of claim 10, wherein the first and second display portions are physically separated from each other and are connected together by an interface.

16. The display device of claim 10, wherein the first image-quality condition includes at least one of a contrast, a brightness, a sharpness, a color saturation and a color to be applied to the first image.

17. The display device of claim 10, wherein the first image is a moving image and the first image-quality setting image is a thumbnail still image of the first image.

18. The display device of claim 10, wherein the first and second display portions are disposed the same display device and are physically connected.

\* \* \* \* \*